No. 888,407. PATENTED MAY 19, 1908.
C. B. SCHOENMEHL.
PRIMARY BATTERY.
APPLICATION FILED JULY 21, 1906.
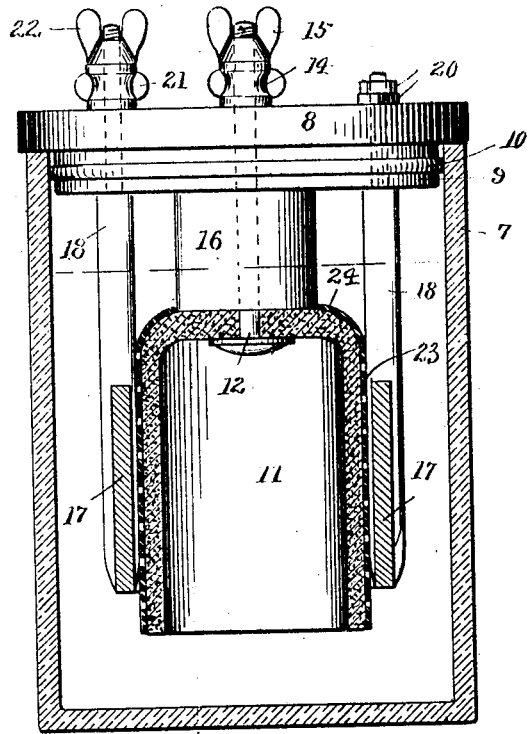
Fig. 1.
Fig. 3.
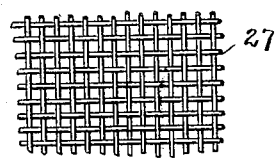
Fig. 2.
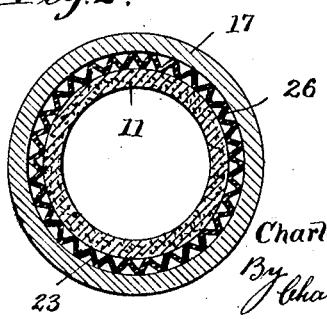
Witnesses
Ruth Raymond.
Alex. L. DeLacey.
Inventor
Charles B. Schoenmehl
By Chamberlain & Newman
Attorneys

UNITED STATES PATENT OFFICE.

CHARLES B. SCHOENMEHL, OF WATERBURY, CONNECTICUT.

PRIMARY BATTERY.

No. 888,407.    Specification of Letters Patent.    Patented May 19, 1908.

Application filed July 21, 1906. Serial No. 327,122.

*To all whom it may concern:*

Be it known that I, CHARLES B. SCHOENMEHL, a citizen of the United States, and resident of Waterbury, in the county of New Haven and State of Connecticut, have invented certain new and useful Improvements in Primary Batteries, of which the following is a specification.

This invention relates to improvements in compressed oxid of copper and zinc types of primary batteries.

It is the chief object of my invention to produce an improved form of battery whereby I may get the minimum amount of internal resistance, and to so construct the battery that an internal short circuiting between the two elements would be impossible; to reduce the size of a battery of a given capacity and to form it more compact and more durable than batteries of this particular class have heretofore been made, thereby producing a battery which will be especially adapted for automobiles yachts, reapers and similar uses.

The several types of compressed oxid of copper and zinc couples of batteries now upon the market have said elements supported from the cover of the jar, the copper element being usually supported central of the jar and the zinc encircling the same or sometimes arranged in two parts on either side of the copper and at a sufficient distance therefrom to prevent the contacting of one element with the other, which feature varies somewhat in the different types and according to the particular class of work to which it is to be applied. More or less trouble, however, has been experienced with batteries of the above type by reason of the fact that sooner or later in the use of the batteries one or the other or perhaps both of the elements become loosened at their point of attachment to the cover and as a result swing to one side or the other in a way to engage the coacting elements, forming a short circuit and destroying the efficiency of the battery. It is also true that the further these elements are located apart the less efficient the batteries are and therefore it is particularly desirable to arrange said elements as close together as possible and yet avoid the liability of the trouble above noted.

In my improved construction therefore I have designed a battery whereby the two elements may be brought very close together and sufficiently so that one will assist in supporting the other, thus making them absolutely rigid with relation to the cover. I employ intermediate of said elements a perforated insulating sheet, supported in any suitable way, and of such a design as to positively prevent said elements engaging one with the other, yet at the same time insuring their free and unobstructed coaction, through the medium of a suitable caustic soda solution, of one element with the other.

With the above objects in view I have designed the novel construction, combination and arrangement of parts shown upon the accompanying sheet of drawing forming a part of this specification, upon which similar numerals of reference denote like or corresponding parts throughout the several figures and of which, Figure 1, shows a central vertical sectional elevation through a battery containing a compressed copper oxid element, and a cylindrical zinc surrounding the same, and my improved insulator intermediate of, and in combination with said elements. Fig. 2, is a transverse sectional plan view, of an annular zinc, a compressed copper oxid cylinder, and a corrugated sheet of insulating material, arranged intermediate of said elements. Fig. 3, shows a detail elevation, of a small piece of wire mesh which may be dipped or covered with an insulating preparation, such for instance as liquid rubber, to form a perforated sheet from wire, covered with an insulator.

Referring in detail to the characters of reference marked upon the drawing, 7 indicates a jar which obviously may be of any preferred design. 8 a porcelain cover adapted to rest upon the top edge of the jar, and having a depending flange 9 to enter the jar, and having a recess to receive a rubber gasket 10 that engages the inner side wall of the jar in a way to firmly support the cover in place upon the jar.

11 represents a compressed cylindrical copper oxid element, supported from the cover by a threaded rod 12 central of the jar through the medium of a jam nut 14 and against which a binding nut 15 operates to engage a field wire, not shown.

16 represents a filling piece of insulating material, encircling the rod 12 and arranged intermediate of the top of the cylinder and the under face of the cover, serving to form a rigid shoulder against which the cylinder may be clamped through the medium of the rod and nut before mentioned.

17 indicates a cylindrical zinc, which is likewise supported from the cover, through the medium of threaded suspending rods 18 arranged at either side.

20 and 21 are jam nuts to engage the rods upon the top side of the cover. The jam nut 21 is provided with a thumb or clamping nut 22 by means of which the second field wire (not shown) is connected to the zinc pole.

23 represents a perforated sheet of insulating material such for instance as hard rubber, and which covers the sides of the compressed copper oxid and is arranged intermediate thereof and the zinc. In Fig. 1, this perforated sheet is shown as being turned in at the top as at 24, to engage the top surface of the cylinder in a way to be supported thereon. In practice the number of perforations contained in this insulating sheet may be greater or lesser than that indicated in the drawing, to insure the results desired. In practice also, we find it preferable for convenience in manipulating the cover and elements attached thereto to connect this insulating sheet to the negative element. It is also true that the particular design of this sheet of insulating material, may be varied to conform to the size and shape of the negative and positive elements employed. These sheets may further be corrugated and the corrugations may be arranged in any suitable manner as for instance vertically as shown at 26 in Fig. 2.

While hard rubber is probably the most effective material from which to make the sheets yet it is practical to form them of other material as for instance wire mesh shown at 27 in Fig. 3, and by coating the same with rubber or other insulating material. Therefore I do not wish to be confined to an insulator formed solely of hard rubber, but reserve the right to use a perforated insulating sheet of any preferred kind.

A battery constructed upon the above lines with a very thin perforated insulating separator interposed between the positive and negative element is over 100 percent. more efficient than the old types of batteries, which is due solely to the possible decrease of internal resistance between the two elements. It is practical to reduce the internal resistance of my present battery to less than 1/100 of an ohm, whereas the commercial oxid of copper and zinc batteries on the market today, have anywhere from three to six 1/100 of an ohm internal resistance.

Having thus described my invention what I claim and desire to secure by Letters Patent is:—

In a primary battery of the class described, the combination with a cover, of a compressed oxid of copper cylinder supported from said cover, a zinc encircling the copper oxid element adjacent thereto and also supported from said cover, and a cylindrical perforated insulating separator with an inwardly projecting supporting flange adapted to bear against said copper oxid element.

Signed at Bridgeport in the county of Fairfield and State of Connecticut this 19th day of July A. D., 1906.

CHARLES B. SCHOENMEHL.

Witnesses:
C. M. NEWMAN,
RUTH RAYMOND.